United States Patent
Gallon

(10) Patent No.: US 8,525,661 B2
(45) Date of Patent: Sep. 3, 2013

(54) WATER VEHICLE BRAKING DISPLAY APPARATUS

(76) Inventor: Mark W. Gallon, Beenleigh (AU)

( * ) Notice: Subject to any disclaimer, the term of this patent is extended or adjusted under 35 U.S.C. 154(b) by 880 days.

(21) Appl. No.: 12/439,213

(22) PCT Filed: Aug. 31, 2007

(86) PCT No.: PCT/AU2007/001259
§ 371 (c)(1),
(2), (4) Date: Oct. 5, 2009

(87) PCT Pub. No.: WO2008/025082
PCT Pub. Date: Mar. 6, 2008

(65) Prior Publication Data
US 2010/0090821 A1   Apr. 15, 2010

(30) Foreign Application Priority Data
Sep. 1, 2006   (AU) .................. 2006211855

(51) Int. Cl.
*B60Q 1/44* (2006.01)
(52) U.S. Cl.
USPC .................. 340/479; 340/425.5; 340/467

(58) Field of Classification Search
USPC ...... 340/479, 438, 456, 441, 425.5, 477–478, 340/480, 466–469, 463–464
See application file for complete search history.

(56) References Cited

U.S. PATENT DOCUMENTS

| | | | | |
|---|---|---|---|---|
| 5,983,154 A | * | 11/1999 | Morisawa | 701/56 |
| 6,023,221 A | * | 2/2000 | Michelotti | 340/471 |
| 6,099,367 A | * | 8/2000 | White et al. | 440/5 |
| 6,641,503 B1 | * | 11/2003 | Bigi | 477/78 |
| 2007/0203625 A1 | * | 8/2007 | Quigley et al. | 701/33 |

FOREIGN PATENT DOCUMENTS

| | | |
|---|---|---|
| EP | 0501555 | 9/1992 |
| EP | 1488991 | 12/2004 |
| WO | 93/15931 | 8/1993 |
| WO | 2004082996 | 9/2004 |
| WO | WO 2004/082996 | * 9/2004 |

* cited by examiner

*Primary Examiner* — Daniel Previl
(74) *Attorney, Agent, or Firm* — Renner, Otto, Boisselle & Sklar, LLP

(57) ABSTRACT

A water vehicle braking display apparatus, the apparatus including at least one sensor adapted to detect changes in input information, a signal generator to generate a signal based upon changes detected in the input information, and a display mounted for at least visual display and operable to produce a display upon receipt that a change has occurred in the input information from the signal generator.

26 Claims, 2 Drawing Sheets

WATER VEHICLE BRAKING DISPLAY APPARATUS

This application is a national phase of International Application No. PCT/AU2007/001259 filed Aug. 31, 2007 and published in the English language.

FIELD OF THE INVENTION

The present invention relates to display apparatus and particularly to display apparatus for displaying the braking activity of vehicles including marine water craft.

BACKGROUND ART

Personal watercraft typically employ a jet pump for generating a directed rearward stream of water which provides the forward thrust required to propel the craft and its occupants. The direction of propulsion is controlled by the positioning of a movable steering nozzle which receives the stream of water from the pump and directs the flow so as to divide the thrust into the desired directional components. The positioning of the nozzle is affected by a steering cable system which connects the nozzle to a handlebar controlled by the driver of the watercraft. The handlebar typically includes a throttle control and an electrical on and off switch.

Importantly, personal water craft are generally manufactured without braking or auxiliary control mechanisms rely on propulsion for control (steering), and reduction of propulsion for slowing. As such, the risk of dangerous accidents involving such watercraft has increased due in large part to the poor braking of the devices and the lack of indication that a personal water craft is slowing or changing direction. This fact is exacerbated by the lack of protection offered to a pilot or rider of water craft.

Attempts have been made to overcome the problem of a personal water craft having no ability to slow itself. One such attempt is disclosed in U.S. Pat. No. 7,007,621. This document also gives an excellent summary of the reasons for that invention which are repeated below verbatim.

"Currently, no satisfactory means are provided for braking the PWC. Auxiliary braking mechanisms are rarely, if ever, utilized. Instead, the throttle must be operated to reduce propulsion so that the PWC will gradually slow. This technique is far from satisfactory. For one thing, when the PWC is operating at a high speed, it can take too long for the vessel to slow to a stop. When the PWC is operating at a speed of 60 mph, for example, it can take up to 300 feet to achieve a complete stop. This obviously subjects the PWC and its rider(s) to the risk of a deadly collision with objects in the water that are too close to avoid. This problem is complicated because most personal watercraft are able to properly steer only when operated under full throttle. When the speed is reduced for braking, control is similarly reduced.

Prior attempts to achieve improved PWC braking have been generally unsuccessful. Reversing operation of the jet nozzle puts enormous and potentially damaging strain upon the nozzle. Fritchle, U.S. Pat. No. 6,691,634 discusses the problems associated with conventional PWC braking systems in considerable detail. That reference discloses a hand-operated mechanism for both controlling and braking operation of the PWC. A pair of braking paddles are mounted about the jet nozzle, which has no capability for directional adjustment. The paddles perform all of the steering, as well as the braking for the PWC. This ignores the fact that most personal watercraft employ a directionally adjustable nozzle and do not require such paddles for steering."

There are also other similar braking devices disclosed in U.S. Pat. No. 5,092,260 to Mardikian (1992), U.S. Pat. No. 5,934,954 to Schott et al. (1999) and U.S. Pat. No. 5,607,332 to Kobayashi et al. (1997).

The prior art has developed seeking a solution to providing a means for slowing a personal water craft rather than developing means for indicating when a personal water craft is slowing.

A pilot or rider of a water craft also finds it relatively simple to judge the speed of a water craft from side on to the vessel by observing the vessel and the wake left behind as it makes way across the water. By the length of the wake, a judgment can be made of its speed. From in front of or behind the vessel though, the ability to judge speed and distance is difficult as a human relies on depth of perception to make this calculation. Also, the wake width is less obvious from the front or rear with a change in speed.

The inventor of the present invention believes that an indicator of this type will decrease the number of accidents involving personal water craft more effectively than providing braking mechanisms as an indicator allows other craft to be made aware of changes in velocity, which in turn allows other craft to evade or account for the slowing. Providing a braking mechanism only partly solves the issue of minimising accidents involving water craft as the craft itself may slow, but give no indication to other water craft.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to a braking display apparatus, which may at least partially overcome at least one of the abovementioned disadvantages or provide the consumer with a useful or commercial choice.

In one form, the invention resides in a braking display apparatus for a vehicle, the apparatus including
  a) at least one sensor means adapted to detect changes in input information,
  b) signal generating means to generate a signal based upon changes detected in the input information, and
  c) a display means mounted for at least visual display and operable to produce a display upon receipt that a change has occurred in the input information from the signal generating means.

In a second form, the invention resides in a method for operating a braking display apparatus for a vehicle, the method including
  a) providing at least one sensor means adapted to detect changes in input information,
  b) measuring the input information in a time period, t,
  c) comparing the input information in the time period, t, to the input information in time period, t−1, to detect changes in the input information,
  d) setting a predetermined change in the input information to trigger a signal,
  e) providing a signal generating means to generate the signal based upon steps b) and c), and
providing a display means mounted for at least visual display and operable to produce a display upon receipt that a change has occurred in the input information from the signal generating means.

In a third form, the invention resides in a braking display apparatus for a vehicle at least one part of which has a repeating pattern when operational and which is substantially proportional to the velocity for the vehicle in use, the apparatus including
   a) at least one sensor means associated with the at least one part of the vehicle having a repeating pattern to measure the repeating pattern and detect changes therein,
   b) signal generating means to generate a signal based upon changes detected in the repeating pattern, and
   c) a display means mounted for at least visual display and operable to produce a display upon receipt that a change has occurred in the repeating pattern from the signal generating means.

In a fourth form, the invention resides in a method for operating a braking display apparatus for a vehicle at least one part of which has a repeating pattern when operational and which is substantially proportional to the velocity for the vehicle in use, the method including
   a. providing at least one sensor means associated with the at least one part of the vehicle having a repeating pattern,
   b. measuring the repeating pattern the repeating pattern in a time period, t,
   c. comparing the repeating pattern in the time period, t, to the repeating pattern in time period, t−1, to detect changes in the repeating pattern,
   d. setting a predetermined change in the repeating pattern to trigger a signal,
   e. providing a signal generating means to generate the signal based upon steps b) and c), and
   f. providing a display means mounted for at least visual display and operable to produce a display upon receipt that a change has occurred in the repeating pattern from the signal generating means.

In a fifth form, the invention resides in a braking display apparatus for a vehicle having a throttle assembly, the apparatus including
   a) at least one sensor means associated with the throttle assembly and adapted to detect changes in throttle position,
   b) signal generating means to generate a signal based upon changes detected in the throttle position, and
   c) a display means mounted for at least visual display and operable to produce a display upon receipt that a change has occurred in the throttle position from the signal generating means.

In a sixth form, the invention resides in a method for operating a braking display apparatus for a vehicle having a throttle assembly, the method including
   a) providing at least one sensor means associated with the throttle assembly and adapted to detect changes in throttle position,
   b) measuring the throttle position in a time period, t,
   c) comparing the throttle position in the time period, t, to the throttle position in time period, t−1, to detect changes in the throttle position,
   d) setting a predetermined change in the throttle position to trigger a signal,
   e) providing a signal generating means to generate the signal based upon steps b) and c), and
   f) providing a display means mounted for at least visual display and operable to produce a display upon receipt that a change has occurred in the throttle position from the signal generating means.

According to the fifth and sixth embodiments of the present invention, the throttle position may be measured and activation of the display means may occur upon measurement of a predetermined change in the throttle position between one timestamp and the previous timestamp.

This embodiment preferably uses the similar or same software filter for converting a rapidly changing analogue throttle input voltage as the remaining embodiments. The sensor will preferably be attached (and already is attached by manufacturer's on most new modern PWC's) to the throttle assembly.

The preferred sensor for this application is an angle-position sensor which detects how much throttle is applied and produces a 0 to 5V output voltage (normally in DC voltage) which is related to the angle of the butterfly valve located on the intake throttle body.

The analogue voltage is sampled every 500 ms like the RPM count value for other preferred embodiments and can be converted to a value between 0 and 255 representing 0% throttle to 100% throttle respectively.

At this point, the throttle value for every 500 ms timestamp can be compared to the previous timestamp, similar to the RPM value of alternative embodiments and the same comparison calculations can be performed for each embodiment.

The present invention is particularly well-suited to use in association with marine and other water craft in particular due to the difficulties in indicating when a water craft is slowing and the lag between a change in throttle speed and a change in the actual velocity of the water craft. It is anticipated however that the apparatus and/or method of the present invention can be applied to any vehicle such as land, air or water travelling vehicles. The present invention is described in the context of water craft and particularly in relation to personal water craft (PWC's), commonly known as "jetski's".

In the present document, the time period may be referred to as a "timestamp".

Detecting speed of a vessel is difficult. Most modern vessels use either a paddle wheel or a water pressure system actuated by the vessel moving through the water. Both methods are grossly inaccurate and prone to failure at the best of times. The vessel does not sit in water all of the time, therefore detecting water speed using these methods is rarely accurate.

A Global Positioning System can be used to detect speed quite accurately, but systems such as these generally have a limited sample rate and can be expensive to implement.

Throttle position sensing whilst better than the aforementioned methods, requires the fitment of a throttle position sensor (TPS). Most new PWC's use such a sensor, but for older models still using a carburetor, this sensor may not be available and fitting one will be a specialist and expensive option.

Engine speed detection or similar is preferred as it is easy to implement, is cost effective, reliable (i.e. Propeller slowing down=Vessel slowing down), and is compatible with every PWC or marine vessel using an engine as when the RPM of the engine increases then so generally, does the propeller.

At least one sensor will be provided as a part of the system. The sensor will typically collect information regarding changes in the operational parameters of the vehicle in order to detect changes in the operational parameters and trigger the display means. The sensor type will be chosen dependant upon the type of information which is being collected or measured or counted and will therefore likely differ depending upon the embodiment of the present invention.

Importantly however, the method of the present invention is typically the same for all embodiments, the main difference lying in the parameter which is measured or how the comparison value is retrieved. In particular, regardless of the input information collected by the at least one sensor, the raw information collected will typically be formatted to give an treated input value which can be compared to a predetermined value to monitor for changes in the input significant enough to trigger the signal generating means to activate the display means.

The system of the invention will preferably include at least one data processor associated with both the at least one sensor and the signal generating means to receive the input information from the at least one sensor, analyse the input information and notify the signal generating means to generate a signal to activate the display means.

The input information may be transmitted from the at least one sensor to the at least one data processor in a stream or in discrete packets. The input information will typically be collected and analysed on a periodic basis. Typically, the measured values will be sampled at regular intervals to determine the changes therein. The measured value may be a point value or alternatively, it may be the sum of the number of a recurring event occurring during the interval.

According to a particularly preferred embodiment of the invention, at the end of each interval or timestamp (which can be of any length; shorter periods are likely to lead to a higher system load and longer periods should be avoided as they would likely decrease the responsiveness of the system), the processor preferably compares the measured value for a given timestamp to the measured value of the previous timestamp.

A change of greater than a predetermined amount in the measured value will then preferably trigger the generation of an activation signal to be transmitted to the display means.

The system of the present invention will also preferably be operable in at least two modes and automatically switch between the two modes. The first mode is preferably an idle mode. In this mode, the system could either disable the display means to allow for low speed operation of the vehicle without the display means being activated, or a periodic activation of the display means may occur to signal low speed operation is occurring until the mode is switched.

The system will preferably be calibrated when first fitted to the vehicle to an idle measured value count. A factor can then be added to this idle measured value count to define an idle/operational threshold. Once the measured value count increases to reach the idle/operational threshold, the system will preferably switch modes to the operational mode and will automatically switch back to idle mode if the measured value count falls below the idle threshold.

Once the system is in the operational mode, the display means is enabled and the system polices the comparison between the measured value in a timestamp and the measured value in the previous timestamp.

The system of the invention also includes a display means. The display means will typically include a visual display means, such as a light source and/or and aural display means such as a siren or horn or similar, or a combination.

A light source such as one or more light emitting diodes (LED's) is preferred as these are visible from distance even in daylight. The display means will preferably be visible/audible from any position around the vehicle but especially from the rear of the vehicle. According to the preferred embodiment of a brakelight for a PWC, the display means may be mounted to a rear portion of the PWC. It is preferred that the mounting is easily attachable and removable, preferably without complex tools and should also be aesthetically pleasing or at least relatively unobtrusive until activated.

The sensor provided may detect changes in any type of repeating pattern such as a physical pattern or an electrical pattern for example. The type of sensor used according to the present invention will typically vary according to the type of measurement being made.

Due to the nature of the vehicle, at least one part of the vehicle will typically produce a repeating pattern.

Typically, a repeating pattern will be produced by most of the parts in the drive means of the vehicle. For example, all engines have moving parts with each part typically having its own repeating pattern. The pattern may be reciprocal or rotational or any other type as long as it repeats.

It is also anticipated that the repeating pattern may not be a physically moving part but may be a signal or similar which repeats. For example, combustion engines using sparkplugs produce a variety of electrical signals, alternator signals and with more conventional engines, computer signals.

In embodiments of the invention adapted to use with moving parts, at leats one part of the engine or drive train is to be preferred due to their relatively accessible position and ease of retrofitting the sensors. The engine and drive train are also relatively directly connected to the drive means and may even be directly connected with a propeller or similar such as in a PWC.

The throttle position may be used as the basis for the sensor but sensors of this type and directed to measuring throttle position can be difficult to implement to obtain reliable information due to constant adjustments which can be quite small. They are also quite difficult to fit in an aftermarket addition.

As stated above, it is preferred that the measured value or input information used is substantially proportional to the velocity of the vehicle. Often forces such as friction or drag will have variable effects on the proportionality of engine speed (as an example) to actual velocity of the vehicle. The system of the invention will preferably account for these effects and also the effects of clutches and the like which effectively disconnect the engine from the drive means. As an example, there may be additional sensors provided which deactivates the display means when the clutch is activated.

One example of a physical pattern which can be used according to the present invention is the revolutions of the propeller shaft. A preferred type of sensor for measuring this type of repeating pattern is known as a Hall Effect sensor. These sensors are currently used to measure wheel rotation in anti-lock braking systems.

Hall effect devices produce a very low signal level and thus require amplification. Many devices now sold as "Hall effect sensors" are in fact a device containing both the sensor described above and a high gain integrated circuit (IC) amplifier in a single package. Recent advances have resulted in the addition of ADC (Analog to Digital) converters and I2C (Inter-integrated circuit communication protocol) IC for direct connection to a microcontroller's I/O port being integrated into a single package.

Hall effect devices when appropriately packaged are immune to dust, dirt, mud, and water. These characteristics make Hall effect devices better for position sensing than alternative means such as optical and electromechanical sensing. A Hall effect sensor can also be used as a non-contacting current sensor.

One of the main problems with Hall effect sensors however is that they are possibly prone to failure when used to measure high revolutions. They also require magnets that form part of the sensor to be physically mounted on or about the rotating shaft making it difficult to retrofit the sensor and for a non-professional to properly locate the sensor.

An example of measurement of an electrical signal is to measure the engine RPM via the pulsed electrical signals associated with the sparkplug firing. Sensors of this type detects when the sparkplug is fired and calculates engine speed over time based on the number of pulses. The advantages of this type of sensor and measuring this type of repeating pattern is that no physical connection or mechanical skills are generally required for installation apart from locating the sensor on a wire leading to/from the sparkplug. The sensor does not have, and is not measuring the movement of, any moving parts and is therefore reliable at all RPM speeds. This method is preferred in the implementation of the present invention.

There are several types of sensors for sensing an electrical or RPM pulse from a sparkplug. Sensors of each type may be mounted directly to an electrical wire extending to or from the sparkplug, for example, a sparkplug lead.

One example is an electromagnetic pickup sensor. These sensors are available in different types. One type of sensor which may be used is an inductive sensor. However, sensors of this type can be adversely affected by capacitive discharge ignition systems which produce a very strong but very short duration sparks, as the spark can be too short in duration to trigger a pulse on deceleration. Sensors of this kind are typically designed to detect changes in EMI drive current.

Another type of sensor which is preferably used is a capacitive sensor. Sensors of this type have fewer problems with detecting triggering pulses and are usually directed at detecting changes in EMI voltage rather than EMI drive current.

A second type of sensor used for sensing an electrical or RPM pulse from a sparkplug is one which detects RPM pulse output from an ignition system. However, not all engines use a compatible ignition system, nor are they often easily accessible by the end user of the vehicle. Also, the pulse parameters such as the frequency are usually reserved by manufacturers for proprietary engine management systems.

The sensor used according to the invention will typically be associated with a data processor for counting/measurement of the sample information collected during the timestamp. The sample information collected from the pickup sensor must typically be "cleaned" to give a reliable pulse for the processor to read and count.

Cleaning of the signal can be achieved using a Silicon Controlled Rectifier (SCR) or transistor to convert an incoming voltage spike to an output pulse of between 0 and 5 volts, to create a compatible pulse output to trigger an electronic/digital timer, for example an NE555 type timer.

An NE555 type timer will create a time base for a pulse width long enough for the processor to read and count each incoming pulse.

The minimum sample time for the incoming pulse will suitably be greater than 125 µS to allow the processor to identify the input, hence the need to condition the signal for a minimum time base via the NE555 type timer.

As stated above, the preferred display means is a brake light and should preferably be lit when the engine speed is decreasing/falling. By counting the RPM inputs at a specific time period such as 500 ms, a comparison with a previous 500 ms count will normally be sufficient to indicate whether or not the RPM is greater or less than that in the previous time period thus determining whether the engine speed (which is more or less directly related to vehicle speed) is increasing or decreasing.

To minimise the effect of small throttle changes which may be insignificant to changes in actual speed, the system of the present invention preferably incorporates a software filter to generate a signal to activate the display means when measured value (the engine speed) has reduced by a significant level. A preliminary value of an amount constituting a significant change may be set at approximately 500 rpm for a PWC. This level of reduction would typically signify a realistic change in vessel speed. This filter when used should reduce the chance of false braking indication whilst riding over small wave and wakes which can trigger small throttle changes.

Once the signal has been conditioned as described above, the RPM pulse from the timer device can be fed into the data processor for counting.

At idle RPM status, the RPM input pulses will generally be spaced apart, providing ample where the data processor is idle or other processing can be performed such as flashing the brake lights or switching modes.

As marine vessels use both 2-stroke and 4-stroke engines, the system of the present invention should preferably be able to differentiate between 2-stroke engines and 4-stroke engines. The system will typically be provided with a means or method to calibrate itself to the engine that the system is being used with.

One preferred method of current calibration is to sample the engine idle speed and save the value in non-volatile RAM. This allows the data processor to boot with a known calibrated value for engine speed during "normal idle speed" operating conditions.

Calibration of the unit to engine speeds is preferably enacted according to the following method steps by a push button which samples the engine when idling.

The preferred process to do this is to switch on engine;
Leave engine Idle; and
Push calibrate button.

According to this method, the processor then samples the speed at idle and stores the value+25%. This 25% buffer allows a threshold of idle speed to allow craft basic slow speed maneuvering without activating the brake light, thus adding robustness and electrical noise immunity to the 20 second count used to flash the LED's when idling.

The value store can be customized to the vessel it's fitted too and can be calibrated with ease if transferred to other engine types or engine tuning changes to normal operation.

The counter, typically included with the data processor, should be able to count as high as the actual RPM rate of the engine. At a 500 ms sample time, it is therefore generally possible to use an 8 bit Microprocessor to count as high as 30,600 RPM in 2-stroke mode and 61,000 RPM in 4-stroke mode. A protection method for engines revving higher than this may be used in a preferred embodiment of the system to prevent counting errors and false indications.

Since the number of inputs and outputs used in the data processor are quite low, a low pin count processor will generally be suitable for the application. The programming language of the processor generally differs between models and manufacturers of processors. One preferred processor used in a preferred embodiment of the invention is the Motorola MC68HC908QT processor. The MC68HC908QT series processor has many advantageous features including flash upgradeable memory, 6 I/O pins and generally requires no external components.

The system of the present invention will preferably be provided with self checking routines in the program to ensure maximum reliability. Diagnostic features will preferably be included in the software program to help diagnose faults and ease installation. Examples of diagnostic features which the system may include are:

RPM OK indicator—An LED indicator to show if the RPM pickup sensor is working and the RPM input is actually getting into the data processor.

Asynchronous Serial Data output—This serial data output is available in wired or wireless infrared form and outputs information about the RPM values and condition codes in the data processor. From this information, the end user or installer can use a computer or a mobile phone with infrared capabilities for example, to perform basic diagnostics and even basic tuning of the engine whilst viewing RPM values on the display. (This is an output only and cannot be used to interface with the engine management system of the craft).

SOS Distress Beacon—The distress beacon is designed for when the user may be experiencing engine problems and is otherwise without methods of propulsion.

The Distress Beacon is a feature which may preferably be activated by holding down the Calibrate/SOS button whilst the engine is not running. The display means or brake light will then preferably begin to flash SOS in Morse code ( . . . - - - . . . ) with a 4 second break between repeats. This beacon preferably self cancel when the system detects the engine has started again, thus disabling the ability to ride around with a SOS beacon active. The distress beacon may also preferably be disabled by a user by pressing and holding the Calibrate/SOS button again. It is to be used merely as an indicator (preferably visual) for distress and aid in rescue. It is not to be relied upon as a sole form of communication for distress, but may include other functionality such as an activatable EPIRB.

According to the most preferred embodiment of the invention, the measured values are counted/measured each half second and compared with the count/measurement from the last half second. The preferred process is as follows:

Count lower than IDLE threshold=Enable Flashing for 20 seconds.

If count greater than IDLE=Then compare to last RPM count
    Count greater than last=Accelerating (Clear LED ON timer and switch off Brake Light)
    Count lower than last=Decelerating
        Is count reduced by less than 500 rpm?
            Ignore small change, Clear LED Timer and switch off Brake light
        Is count reduced by 500 rpm-1000 rpm ?
            Add 2 Seconds to LED ON Timer
        Is count reduced by 1000 rpm-1500 rpm ?
            Add 2.5 Seconds to LED ON Timer
        Is count reduced by 1500 rpm-2000 rpm ?
            Add 4 Seconds to LED ON Timer
        Is count reduced by 2000 rpm-2500 rpm ?
            Add 5 Seconds to LED ON Timer
        Is count reduced by 3000 rpm?
            Add 6 Seconds to LED ON Timer The above process typically occurs in each 500 ms period. The changes in successive 500 ms periods will preferably be cumulative and increase the time on the LED ON timer, as long as the vehicle is still decelerating. For example: If RPM is reduced by more than 6000 rpm in a second. Then over the two periods (2×500 ms), 12 seconds will have been added to the count down timer. On a PWC or Boat, this level of engine speed reduction will have massive braking effect and may take up to 12 seconds to actually reduce the vessel's physical speed in relation to the engine speed. This buffer time is not fixed and may vary for the size of the vessel with which the system is used. It also preferably allows for multiple profiles to be configured for a variety of sized vessels.

Typically, even when a vessel has come to a complete stop, the water wash from the vessel is still moving away from the hull. This gives a false visual indication that the vehicle is still under power. Therefore, the system of the present invention preferably includes a 20-second activation of the display means to indicate that the vessel has come to a complete stop. The preferred 20-second buffer is typically enough time for the wash to disperse and after that time period, the vessel should be visually identifiable as being stationary. In the context of the preferred brake light embodiment, the brake light will preferably flash for the 20-second period at a flashing rate of 250 ms On/250 ms Off. This particular rate has been chosen so as not to be confused with International Association Of Marine Aids To Navigation And Lighthouse Authorities (IALA) marine navigation indicators, and may vary.

Suitably, the time period, t, will be relatively short to minimise the possibility of changes during the time period. Typically, the step of measuring the input information (including the measurement of the repeating pattern or throttle position will be performed at the end of each time period, t, and compared to the measurement taken at the end of the previous time period, t−1.

The method of the present invention is typically the same for both the repeating pattern and throttle position speed detection methods, the main difference lying in the parameter which is measured or how the comparison value is retrieved.

For example, using the RPM pulse input, a counter can be used which is incremented every time a pulse is detected. The timestamp is preferably 500 ms and a total count is arrived at in every 500 ms timestamp. The maximum count possible in a 500 ms period is 255 pulses which equates to 30,600 rpm and the count from each timestamp is ascribed a value between 0 and 255. This 0-255 Value is used as the comparison value according to a first embodiment which measures the repeating pattern.

According to the throttle sensor embodiment, the input is a voltage between 0 and 5V. In every 500 ms timestamp, the voltage is sampled and converted to a value between 0 and 255 is ascribed on the basis if the magnitude of the voltage, zero being IDLE and 255 being Full throttle. This 0-255 Value is used as the comparison value according to a second embodiment which measures the throttle position.

The specific time period used according to the invention for the measurement period may be of any length. A period length of 500 ms as mentioned in the explanations herein is a preferred period for one embodiment but any time period can be chosen and may be preferred in circumstances.

BRIEF DESCRIPTION OF THE DRAWINGS

Various embodiments of the invention will be described with reference to the following drawings, in which.

DETAILED DESCRIPTION OF THE PREFERRED EMBODIMENT

Figure 1:
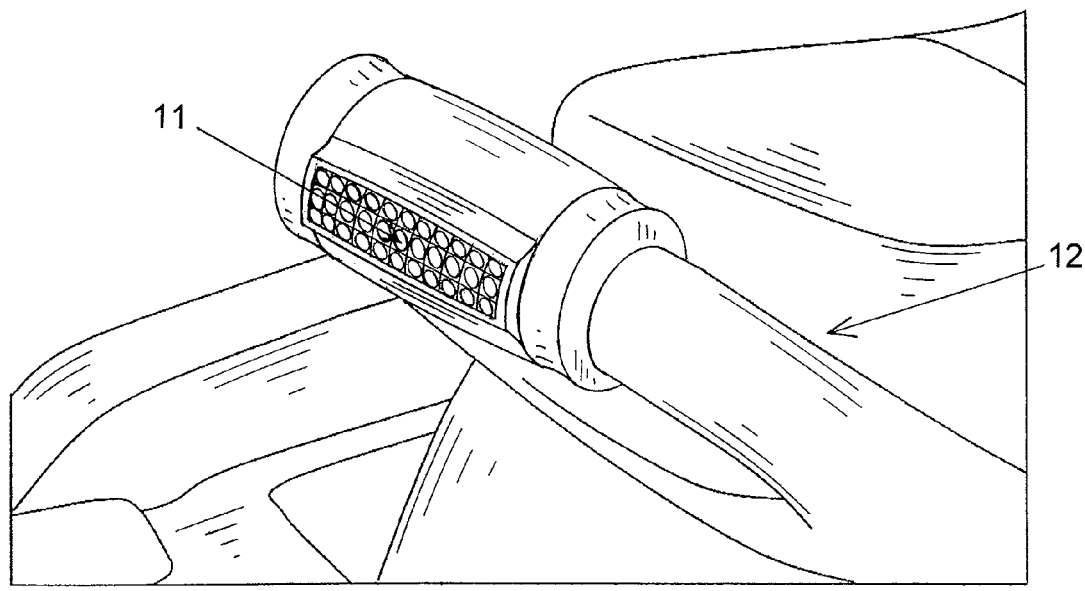
FIG. 1 is a close-up perspective view from the rear of a brake light according to a preferred embodiment of the present invention.

According to a particularly preferred embodiment of the present invention a braking display apparatus and method of use therefore is provided.

The braking display apparatus of the preferred embodiment includes a sensor (illustrated in FIG. 4) adapted to detect changes in input information which can originate from any one of a number of sources. The apparatus also includes signal generating means (not shown) to generate a signal based upon the changes detected in the input information and a brake light (FIGS. 1-3) mounted for visual display and operable to be lit upon receipt that a change has occurred in the input information from the signal generating means. The physical components are illustrated in the Figures but the system also has a computer implemented software component embodying a preferred method of operation.

The method includes the steps of providing a sensor adapted to detect changes in input information, measuring the input information in a time period, t, comparing the input information in the time period, t, to the input information in time period, t−1, to detect changes in the input information, setting a predetermined change threshold value to trigger a signal, providing a signal generating means to generate a signal based upon the threshold value and providing a brake light mounted for visual display and operable to be lit upon receipt that a change has occurred in the input information from the signal generating means.

The present invention is particularly well-suited to use in association with marine craft including Personal Water Craft and boats in particular due to the difficulties in indicating when a water craft is slowing and the lag between a change in throttle speed and a change in the velocity of the water craft.

According to the preferred embodiment of the invention, the measured values are counted/measured each half second and compared with the count/measurement from the last half second. The preferred process is as follows:

Count lower than IDLE threshold=Enable Flashing for 20 seconds.
If count greater than IDLE=Then compare to last RPM count
    Count greater than last=Accelerating (Clear LED ON timer and switch off Brake Light)
    Count lower than last=Decelerating
        Is count reduced by less than 500 rpm?
            Ignore small change, Clear LED Timer and switch off Brake light
        Is count reduced by 500 rpm-1000 rpm ?
            Add 2 Seconds to LED ON Timer
        Is count reduced by 1000 rpm 1500 rpm ?
            Add 2.5 Seconds to LED ON Timer
        Is count reduced by 1500 rpm-2000 rpm ?
            Add 4 Seconds to LED ON Timer
        Is count reduced by 2000 rpm-2500 rpm ?
            Add 5 Seconds to LED ON Timer
        Is count reduced by 3000 rpm?
            Add 6 Seconds to LED ON Timer The above process occurs in each 500 ms period. The changes in successive 500 ms periods will preferably be cumulative and increase the time on the LED ON timer, as long as the vehicle is still decelerating. For example: If RPM is reduced by more than 6000 rpm in a second. Then over the two periods (2×500 ms), 12 seconds will have been added to the count down timer. On a PWC or Boat, this level of engine speed reduction will have massive braking effect and may take up to 12 seconds to actually reduce the vessel's physical speed in relation to the engine speed. This buffer time is not fixed and may vary for the size of the vessel with which the system is used. It also preferably allows for multiple profiles to be configured for a variety of sized vessels.

The sensor collects information regarding changes in the operational parameters of the vehicle in order to detect changes therein and trigger the activation of the brake light.

Importantly, the method of the present invention is generally the same for all embodiments, the main difference lying in the parameter which is measured or how the comparison value is retrieved. In particular, regardless of the input information collected by the sensor 10, the raw information collected will typically be formatted to give a treated input value which can be compared to a predetermined threshold value to monitor for changes in the input significant enough to trigger the signal generating means to activate the brake light 11.

The system of the invention includes a data processor associated with both the sensor 10 and the signal generating means to receive the input information from the sensor, analyse the input information and notify the signal generating means to generate a signal.

According to a particularly preferred embodiment of the invention, at the end of each interval or timestamp (which can be of any length; shorter periods are likely to lead to a higher system load and longer periods should be avoided as they would likely decrease the responsiveness of the system), the processor compares the measured value for the timestamp to the measured value of the previous timestamp.

A change of at least a predetermined amount in the measured value will then trigger the generation of an activation signal to be transmitted to the brake light 11 as described above.

The system of the preferred embodiment of the present invention is operable in two modes and automatically switches between the two modes. The first mode is an idle mode. In this mode, the system could either disable the display means to allow for low speed operation of the vehicle without the display means being activated, or a periodic activation of the display means may occur to signal low speed operation is occurring until the mode is switched.

The preferred embodiment of the apparatus is calibrated when first fitted to the vehicle to an idle measured value count. A factor is then added to this idle measured value count to define an idle/operational threshold. Once the measured value count increases to reach the idle/operational threshold, the system switches modes to the operational mode and will automatically switch back to idle mode if the measured value count falls below the idle threshold.

Once the system is in the operational mode, the brake light 11 is enabled and the system polices the comparison between the measured value in a timestamp and the measured value in the previous timestamp.

Figure 2:
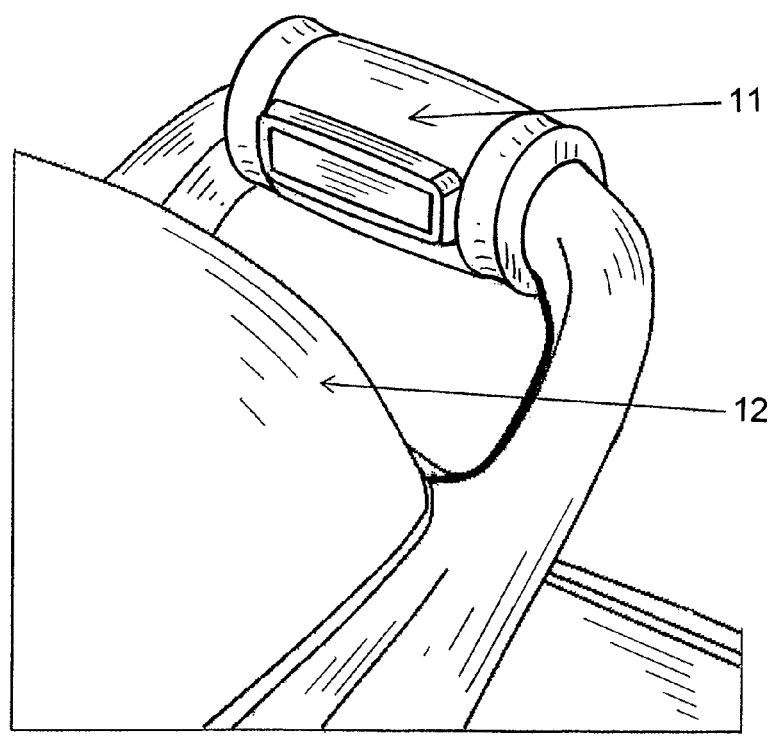
FIG. 2 is a close-up perspective view from the side of a personal water craft of a brake light according to a preferred embodiment of the present invention.
Figure 3:
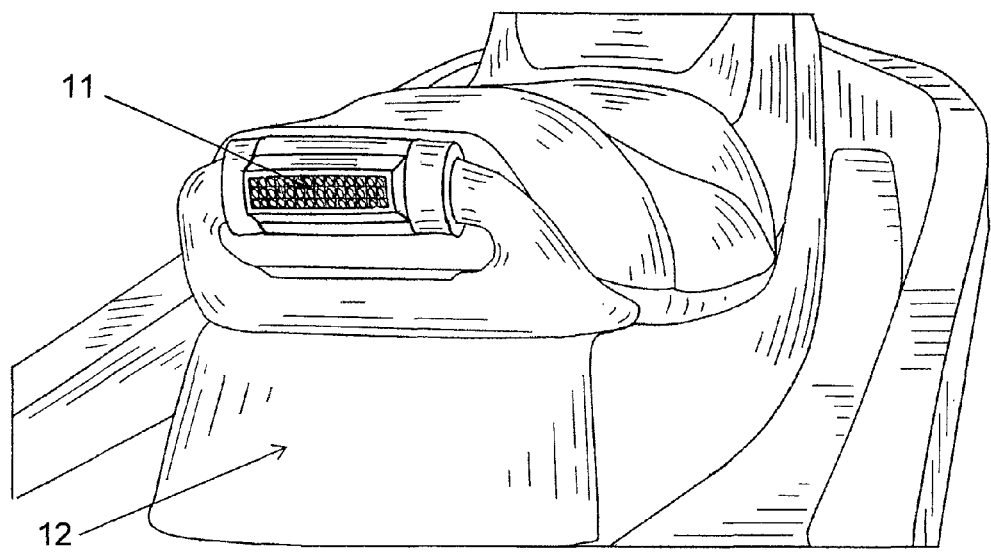
FIG. 3 is a perspective view from the rear of a brake light according to a preferred embodiment of the present invention.
Figure 4:
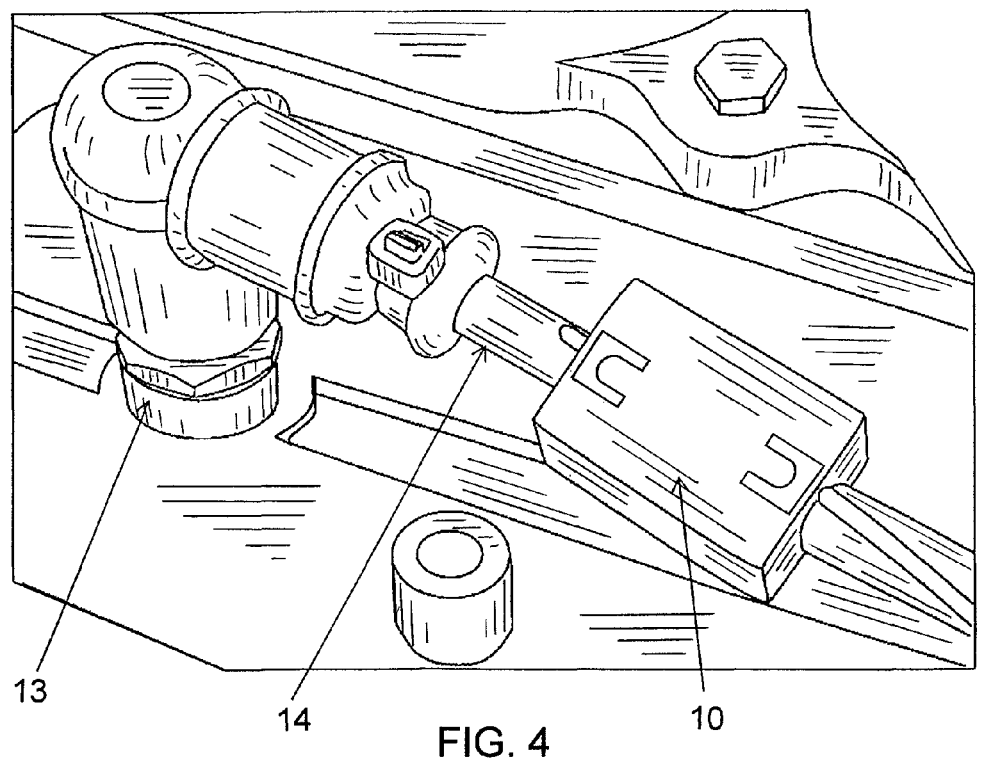
FIG. 4 is a perspective view of a sensor used in association with a spark plug lead according to a preferred embodiment of the present invention.

The brake light of the preferred embodiment includes a plurality of light emitting diodes (LED's) as illustrated in FIGS. 1 to 3, as these are visible from distance even in daylight. According to the preferred embodiment of a brake light for a PWC illustrated, the brake light is mounted to a rear portion of the PWC 12. The mounting illustrated in the Figures includes a resilient sleeve of shock absorbing material which is easily attachable and removable on a rear bar adjacent the seat of the PWC.

According to the preferred embodiment, the sensor 10 provided detects changes in a repeating pattern, which in the illustrated case, is the pattern of electrical signals associated with the sparkplug firing. Sensors of this type detect when the sparkplug 13 is fired and calculates engine speed over time based on the number of pulses. The advantages of this type of sensor and measuring this type of repeating pattern is that no physical connection or mechanical skills are generally required for installation apart from locating the sensor on a spark plug lead 14 leading to the sparkplug 13. The sensor does not have, and is not measuring the movement of, any moving parts and is therefore reliable at all RPM speeds.

There are several types of sensors for sensing an electrical or RPM pulse from a sparkplug. The sensor preferably used is a capacitive sensor. Sensors of this type have fewer problems with detecting triggering pulses and are usually directed at detecting changes in voltage rather than current.

The sensor is associated with a data processor for counting or measuring of the sample information collected during the timestamp. The sample information collected from the pickup sensor is generally "cleaned" to give a reliable pulse for the processor to read and count.

Cleaning of the signal in the preferred embodiment is achieved using a Silicon Controlled Rectifier (SCR) or transistor to convert an incoming voltage spike to an output pulse of between 0 and 5 volts, to create a compatible pulse output to trigger an electronic/digital timer, which in the preferred embodiment an NE555 type timer. An NE555 type timer creates a time base for a pulse width long enough for the processor to read and count each incoming pulse.

The minimum sample time for the incoming pulse will suitably be greater than 125 µS to allow the processor to identify the input, hence the need to condition the signal for a minimum time base via the NE555 type timer.

As stated above, the brake light will be lit when the engine speed is decreasing/falling. By counting the RPM inputs at a specific time period such as 500 ms, a comparison with a previous 500 ms count will normally be sufficient to indicate whether or not the RPM is greater or less than that in the previous time period thus determining whether the engine speed (which is more or less directly related to vehicle speed) is increasing or decreasing.

To minimise the effect of small throttle changes which may be insignificant to changes in actual speed, the preferred embodiment incorporates a software filter to generate a signal to activate the display means when measured value (the engine speed) has reduced by a significant level. A preliminary value of an amount constituting a significant change may be set at approximately 500 rpm for a PWC. This level of reduction would typically signify a realistic change in vessel speed. This filter when used should reduce the chance of false braking indication whilst riding over small wave and wakes which can trigger small throttle changes.

Once the signal has been conditioned as described above, the RPM pulse from the timer device can be fed into the data processor for counting.

As marine vessels use both 2-stroke and 4-stroke engines, the preferred embodiment is able to differentiate between 2-stroke engines and 4-stroke engines. The system is provided with a means and/or method to calibrate itself to the engine that the system is being used with, the preferred method of calibration being to sample the engine idle speed and save the idle value in non-volatile RAM. This allows the data processor to boot with a known calibrated value for engine speed during "normal idle speed" operating conditions.

Calibration of the unit to engine speeds is preferably enacted according to the following method steps by a push button which samples the engine when idling.

The preferred process to do this is to switch on engine;
Leave engine Idle; and
Push calibrate button.

According to this method, the processor then samples the speed at idle and stores the value+25%. This 25% buffer allows a threshold of idle speed to allow craft basic slow speed maneuvering without activating the brake light, thus adding robustness and electrical noise immunity to the 20 second count used to flash the LED's when idling.

The counter, typically at least a part of the data processor, should be able to count as high as the actual RPM rate of the engine. At a 500 ms sample time, it is therefore generally possible to use an 8 bit Microprocessor to count as high as 30,600 RPM in 2-stroke mode and 61,000 RPM in 4-stroke mode. A protection method for engines revving higher than this may be used in a preferred embodiment of the system to prevent counting errors and false indications.

Since the number of inputs and outputs used in the data processor are quite low, a low pin count processor can be used. The programming language of the processor generally differs between models and manufacturers of processors. The preferred processor is the Motorola MC68HC908QT processor. The MC68HC908QT series processor has many advantageous features including flash upgradeable memory, 6 I/O pins and generally requires no external components.

The system of the present invention will preferably be provided with self checking routines in the program to ensure maximum reliability. Diagnostic features will preferably be included in the software program to help diagnose faults and ease installation. Examples of diagnostic features which the system may include are:

D RPM OK indicator—An LED indicator to show if the RPM pickup sensor is working and the RPM input is actually getting into the data processor.

Asynchronous Serial Data output—This serial data output is available in wired or wireless infrared form and outputs information about the RPM values and condition codes in the data processor. From this information, the end user or installer can use a computer or a mobile phone with infrared capabilities for example, to perform basic diagnostics and even basic tuning of the engine whilst viewing RPM values on the display. (This is an output only and cannot be used to interface with the engine management system of the craft).

SOS Distress Beacon—The distress beacon is designed for when the user may be experiencing engine problems and is otherwise without methods of propulsion.

The Distress Beacon is a feature which may preferably be activated by holding down the Calibrate/SOS button whilst the engine is not running. The display means or brake light will then preferably begin to flash SOS in Morse code ( . . . - - - . . . ) with a 4 second break between repeats. This beacon preferably self cancel when the system detects the engine has started again, thus disabling the ability to ride around with a SOS beacon active. The distress beacon may also preferably be disabled by a user by pressing and holding the Calibrate/SOS button again. It is to be used merely as an indicator (preferably visual) for distress and aid in rescue. It is not to be relied upon as a sole form of communication for distress, but may include other functionality such as an activatable EPIRB.

Typically, even when a vessel has come to a complete stop, the water wash from the vessel is still moving away from the hull. This gives a false visual indication that the vehicle is still under power. Therefore, the system of the present invention preferably includes a 20-second activation of the display means to indicate that the vessel has come to a complete stop. The preferred 20-second buffer is typically enough time for the wash to disperse and after that time period, the vessel should be visually identifiable as being stationary. In the context of the preferred brake light embodiment, the brake light will preferably flash for the 20-second period at a flashing rate of 250 ms On/250 ms Off. This particular rate has been chosen so as not to be confused with International Association Of Marine Aids To Navigation And Lighthouse Authorities (IALA) marine navigation indicators, and may vary.

The method of the present invention is typically the same for both the repeating pattern and throttle position speed detection methods, the main difference lying in the parameter which is measured or how the comparison value is retrieved.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A water vehicle braking display apparatus for a vehicle at least one part of which has a repeating mechanical pattern when operational, the apparatus including
    at least one sensor associated with the at least one part of the vehicle having the repeating mechanical pattern and adapted to measure input information in a time period, t, relating to the repeating mechanical pattern,
    a controller comparing the input information in the time period, t, to the input information in time period, t−1, to detect changes in the input information, and setting a predetermined change in the input information to trigger a signal,
    a signal generator to generate a signal based upon changes detected in the input information, and
    a display mounted for at least visual display and operable to produce a display upon receipt that a change has occurred in the input information from the signal generator.

2. The apparatus according to claim 1 further including at least one data processor associated with both the at least one sensor and the signal generator to receive the input information from the at least one sensor, analyse the input information and notify the signal generator to generate a signal to activate the display.

3. The apparatus according to claim 2 wherein the input information collected by the at least one sensor is processed using a Silicon Controlled Rectifier (SCR) or transistor to convert an incoming voltage spike to an output pulse of between 0 and 5 volts, to create a compatible pulse output to trigger an electronic/digital timer.

4. The apparatus according to claim 3 wherein the minimum sample time for the incoming pulse is greater than 125 µS to allow the processor to identify the input.

5. The apparatus according to claim 3 further including diagnostic features to help diagnose faults and ease installation.

6. The apparatus according to claim 5 wherein the diagnostic features include at least one of an LED indicator to show if the sensor is operational, an LED indicator to show if the input information is being received into the data processor, a data output, and a distress beacon for use when the user may be experiencing engine problems and is otherwise without methods of propulsion.

7. The apparatus according to claim 6 wherein the distress beacon is activated manually and when activated, the display transmits a repeating Morse code SOS signal.

8. The apparatus according to claim 7 wherein the beacon self cancels when the engine is started again.

9. The apparatus according to claim 1 operable in at least two modes and automatically switchable between the two modes, the first mode being an idle mode in which the display is deactivated and an operational mode above idle in which the display is activated.

10. The apparatus according to claim 9 wherein the apparatus is calibrated when fitted to the vehicle to an idle input information, a factor is added to this idle input information to define an idle/operational threshold, wherein once the input information increases to reach the idle/operational threshold, the apparatus switches modes to the operational mode and automatically switches back to idle mode if the input information falls below the idle threshold.

11. An apparatus according to claim 1 wherein the display includes one or more light emitting diodes (LED's).

12. A water vehicle braking display apparatus for a vehicle at least one part of which has a repeating electrical signal pattern when operational, the apparatus including
    at least one sensor associated with the at least one part of the vehicle having the repeating pattern to measure input information in a time period, t, relating to the repeating electrical signal pattern,
    a controller comparing the input information in the time period, t, to the input information in time period, t−1, to detect changes in the input information, and setting a predetermined change in the input information to trigger a signal,
    a signal generator to generate a signal based upon changes detected in the repeating electrical signal pattern by the controller, and
    a display mounted for at least visual display and operable to produce a display upon receipt that a change has occurred in the repeating pattern from the signal generator.

13. The apparatus according to claim 12 wherein at least one sensor provided detects changes in any type of repeating pattern such as a physical pattern or an electrical pattern for example.

14. The apparatus according to claim 12 wherein the repeating pattern is a pulsed electrical signals associated with a spark plug firing.

15. The apparatus according to claim 14 wherein the sensor is mounted directly to an electrical wire extending to or from the sparkplug.

16. The apparatus according to claim 15 wherein the sensor used is a capacitive sensor.

17. A water vehicle braking display apparatus for a vehicle having a throttle assembly, the apparatus including
    at least one sensor means associated with the throttle assembly and adapted to measure input information in a time period, t, relating to throttle position,
    a controller comparing the input information in the time period, t, to the input information in time period, t−1, to detect changes in the input information, and setting a predetermined change in the input information to trigger a signal,
    a signal generator to generate a signal based upon changes detected in the throttle position by the controller, and a display mounted for at least visual display and operable to produce a display upon receipt that a change has occurred in the throttle position from the signal generator.

18. An apparatus according to claim 17 wherein the at least one sensor is an angle position sensor to detect how much throttle is applied and produces a 0 to 5V output voltage.

19. A method for operating a braking display apparatus for a vehicle, the method including
   a. providing at least one sensor adapted to detect changes in input information,
   b. measuring the input information in a time period, t,
   c. comparing the input information in the time period, t, to the input information in time period, t–I, to detect changes in the input information,
   d. setting a predetermined change in the input information to trigger a signal,
   e. providing a signal generator to generate the signal based upon steps b) and c), and
   providing a display mounted for at least visual display and operable to produce a display upon receipt that a change has occurred in the input information from the signal generator.

20. A method according to claim 19 wherein an analogue voltage from the at least one sensor is sampled every period and converted to a value between 0 and 255 representing 0% throttle to 100% throttle respectively for comparison purposes.

21. The method according to claim 20 wherein the period is chosen from the group including 100 ms, 250 ms, 500 ms and 1 second.

22. A method according to claim 19 calibrated when fitted to the vehicle to collect an idle input information measurement, a factor added to this idle input information to define an idle/operational threshold, wherein once the input information increases to reach the idle/operational threshold, the display enters an operational mode and automatically switches back to an idle mode if the input information measurement falls below the idle threshold.

23. The method according to either claim 22 wherein the input information is sampled each half second and compared with the sampled input information according to the protocol:
   a. Input information lower than idle threshold=Enable display flashing for 20 seconds.
   b. If input information greater than idle=Then compare to last input information
      i. Input information greater than last=Accelerating (Clear display timer and switch off display)
      ii. Input information lower than last=Decelerating
         a. If Input information reduced by less than 500 rpm, then Ignore small change, Clear display means timer and switch off display;
         b. If Input information reduced by 500 rpm-1000 rpm, then Add 2 Seconds to display timer;
         c. If Input information reduced by 1000 rpm-1500 rpm, then Add 2.5 Seconds to display timer;
         d. If input information reduced by 1500 rpm-2000 rpm, then Add 4 Seconds to display timer;
         e. If Input information reduced by 2000 rpm-2500 rpm, then Add 5 Seconds to display timer;
         f. If Input information reduced by 3000 rpm, then Add 6 Seconds to display timer.

24. The method according to anyone of claim 19 wherein the step of measuring the input information is performed at the end of each time period, t, and compared to the measurement taken at the end of the previous time period, t–I.

25. A method for operating a braking display apparatus for a vehicle at least one part of which has a repeating pattern when operational and which is substantially proportional to the velocity for the vehicle in use, the method including
   a. providing at least one sensor associated with the at least one part of the vehicle having a repeating pattern,
   b. measuring the repeating pattern the repeating pattern in a time period, t,
   c. comparing the repeating pattern in the time period, t, to the repeating pattern in time period, t–I, to detect changes in the repeating pattern,
   d. setting a predetermined change in the repeating pattern to trigger a signal,
   e. providing a signal generator to generate the signal based upon steps b) and c), and
   providing a display mounted for at least visual display and operable to produce a display upon receipt that a change has occurred in the repeating pattern from the signal generator.

26. A method for operating a braking display apparatus for a vehicle having a throttle assembly, the method including
   a. providing at least one sensor associated with the throttle assembly and adapted to detect changes in throttle position,
   b. measuring the throttle position in a time period, t,
   c. comparing the throttle position in the time period, t, to the throttle position in time period, t–I, to detect changes in the throttle position,
   d. setting a predetermined change in the throttle position to trigger a signal,
   e. providing a signal generator to generate the signal based upon steps b) and c), and
   f. providing a display mounted for at least visual display and operable to produce a display upon receipt that a change has occurred in the throttle position from the signal generator.

* * * * *

UNITED STATES PATENT AND TRADEMARK OFFICE
CERTIFICATE OF CORRECTION

PATENT NO.        : 8,525,661 B2
APPLICATION NO. : 12/439213
DATED             : September 3, 2013
INVENTOR(S)       : Mark W. Gallon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Fifteenth Day of September, 2015

Michelle K. Lee
*Director of the United States Patent and Trademark Office*